Sept. 4, 1962 R. D. PLATT 3,052,796
PHOTOMULTIPLIER TUBE ENCLOSURE
Filed Aug. 31, 1959
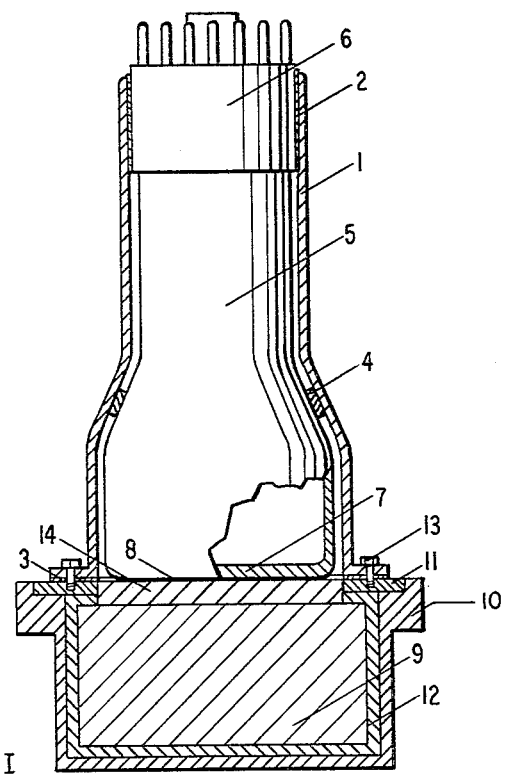
FIG. I
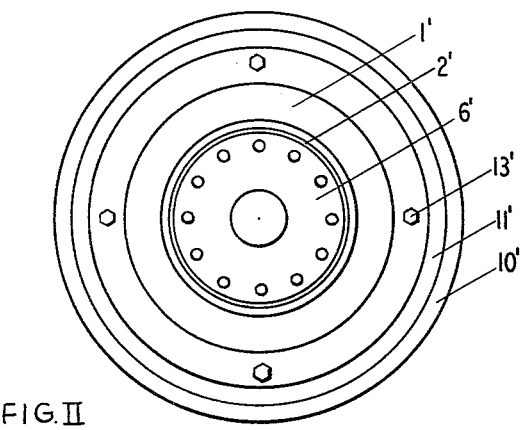
FIG. II
RICHARD PLATT, INVENTOR.
BY
William H Brown United States Patent Office 3,052,796
Patented Sept. 4, 1962

3,052,796
PHOTOMULTIPLIER TUBE ENCLOSURE
Richard D. Platt, Bay Village, Ohio, assignor to The Harshaw Chemical Company, Cleveland, Ohio, a corporation of Ohio
Filed Aug. 31, 1959, Ser. No. 837,198
3 Claims. (Cl. 250—71.5)

This invention relates to a photomultiplier tube enclosure of a type suitable for use as a coupling member.

The photomultiplier tube consists of a cylindrical glass envelope surrounding an electrode system called the dynodes. The top surface of the cylindrical glass envelope is the end window. On the inner face of the window is deposited the light sensing photocathode. Light incident on the photocathode causes the photocathode to emit photoelectrons, which are then focused and accelerated to the dynode system.

Photomultiplier tubes are suitably coupled to luminophores which are devices which have the ability to convert radiation energy to light energy. Components consisting of a luminophore coupled with the photomultiplier tube are generally known as scintillation meter components. In practice radiation energy from a source of radiation strikes the luminophore causing flashes of light to occur. The flashes of light or scintillations are directed to the photomultiplier tube where they are converted into an electric current at the photocathode and then amplified by a system of secondary emitting electrodes within the tube. The current output from the photomultiplier tube is sent to electronic devices which process and display the information contained in the output current.

In order to function properly, the photomultiplier tube must be securely fastened to and contacted with the luminophore and must be shielded from all sources of outside light and also desirably shielded from external magnetic and electrostatic fields.

It is, therefore, an object of this invention to produce a photomultiplier tube enclosure which will serve as a mechanical coupling medium between a luminophore and a photomultiplier tube.

It is another object of this invention to produce a photomultiplier tube enclosure which will shield the photomultiplier tube from all outside light sources and also from all outside magnetic and electrostatic fields.

It is still another object of this invention to produce a photomultiplier tube enclosure which exerts a positive pressure against the photomultiplier tube, whereby the photomultiplier tube is firmly contacted with a coupled member, such as a luminophore.

In practice photomultiplier tubes are joined to luminophores by means of an optical coupling medium such as, for instance, a silicone grease. The grease, however, is an optical coupling only and has no mechanical strength. It is, therefore, necessary to fix the position of the photomultiplier tube by means of a mechanical coupling member. It is also necessary to insure firm contact of the photomultiplier tube with the luminophore by means of a positive downward pressure exerted against the photomultiplier tube.

When the photomultiplier tube is properly coupled to a luminophore, accurate readings of nuclear radiation energy presenting itself to the luminophore may be had. However, the accuracy of such readings are disturbed by external sources of light and external magnetic and electrostatic fields. The external sources of light will be recorded by the scintillation meter and give an indication of greater quantities of radiation energy than are actually present. This is the result of external sources of light being converted within the photomultiplier tube to electronic impulses. It has also been found that external magnetic and electrostatic fields will cause a photomultiplier tube to behave in an erratic manner and thereby disturb the accuracy of any radiation measurement readings.

I have now discovered a photomultiplier tube enclosure which will serve as a mechanical coupling member, a shield from external light sources, a shield from external magnetic and electrostatic fields, and also as a means for exerting a positive downward pressure against a photomultiplier tube in order to affect a firm juncture between the photomultiplier tube and a luminophore.

The photomultiplier tube enclosure is made up of certain basic materials. The photomultiplier tube enclosure body may be constructed from any opaque material having a sufficient degree of strength and rigidity. The preferred materials, however, are metallic and have in high degree the ability to absorb magnetic and electrostatic energy such as, for instance, mumetal which is a high permeability, isotropic, magnetic alloy containing approximately 77.2% nickel, 4.1% copper, 1.5% chromium and 14.9% iron. Other metals which are known to the art of magnetic and electrostatic shielding and are marketed under various trademarks are Fernetic and Co-netic. Materials which are used in excluding light from external sources are flexible gasket materials and, more particularly, fabric materials such as, for instance, felt. The positive pressure device contained within the photomultiplier tube enclosure may be made from any resilient material but preferably from a rubber material such as, for instance, sponge rubber.

The specific design of a photomultiplier tube enclosure is dependent on the shape of the photomultiplier tube itself. However, in general, the photomultiplier tube enclosure is designed for use with the photomultiplier tube of the type having a photo cathode of greater diameter than the electrical contact base. The photomultiplier tube enclosure for a photomultiplier tube of this type consists of a tubular member having a flanged bell-shaped flare at one terminus that is, nearer one terminus than the other, a resilient ring axially mounted within the bell portion of said tubular member and light tight seals at both ends of said tubular member whereby a photomultiplier tube mounted therein will be sealed from light and subjected to a positive pressure from said resilient ring. The flanged portion of the tubular member is bored at regular intervals to receive retaining screws.

The photomultiplier tube enclosure may be used to couple a photomultiplier tube to a luminophore whose coupling face is the same size as the end window of the photomultiplier tube or to a luminophore whose coupling face is of a greater or lesser size than the end window of the photomultiplier tube. The coupling face may be defined as that planar surface of a luminophore which is joined with one or more photomultiplier tubes. The preferred luminophore is a scintillation crystal such as a thallium activated sodium iodide crystal. As thallium activated sodium iodide crystals are generally packed in a metal container having a glass window in one face, the photomultiplier tube enclosure may be coupled to the metal portion of the crystal enclosure which surrounds the glass window. The coupling surface of the photomultiplier tube enclosure is the flanged portion surrounding the bell-shaped flare of the structure. Where the crystal has a larger coupling face than the end window of the photomultiplier tube, the crystal metal enclosures have several glass windows mounted on the coupling face. Where a crystal enclosure has a plurality of glass windows, a plurality of photomultiplier tubes may be mounted thereon.

Other novel features of the invention will be apparent from the description of the drawings which follows:

FIGURE I, which is not to scale, is a sectional side view of the photomultiplier tube enclosure as employed in a scintillation meter component. FIGURE II, which is not to scale, is a top view of the photomultiplier tube enclosure employed in a scintillation meter component.

In FIGURE I the body of the photomultiplier tube enclosure 1 encloses a photomultiplier tube 5. A resilient ring member 4 is disposed on the interior of the photomultiplier tube enclosure body 1 coaxially therewith so as to contact the photomultiplier tube 5. A gasket member 2 is disposed at one end of the photomultiplier tube body 1 so as to be in contact with the electrical contact base 6 of the photomultiplier tube 5. A gasket member 3 is disposed on the flanged portion of the photomultiplier enclosure body 1 so as to be in contact with the retaining ring 11. Photomultiplier tube 5 is contacted at its end window 7 with a glass window 14. An optical coupling grease coating 8 is disposed between the end window 7 and the glass window 14. Retaining screws 13 couple the photomultiplier tube enclosure body 1 to the retaining ring 11. The retaining ring 11 is joined to the crystal housing component 10 which encloses the scintillation crystal 9 and a reflective coating material 12.

In FIGURE II the photomultiplier tube enclosure body 1' encloses a photomultiplier tube electrical contact base 6'. A gasket member 2' is disposed on the photomultiplier tube body 1' so as to be in contact with the electrical contact base 6'. The photomultiplier enclosure body 1' is coupled to a retaining ring 11' by means of retaining screws 13' fitted through orifices in the flanged portion of the photomultiplier tube enclosure 1'. The retaining ring 11' is fitted to a scintillation crystal housing component 10'.

In practice a photomultiplier tube enclosure of FIGURE I serves to exert a downward pressure against the photomultiplier tube 5 by means of resilient ring member 4. This downward pressure assures a firm contact between the end window 7 of the photomultiplier tube 5 and the optical grease coupling coating 8 and the glass window 14. The photomultiplier tube 5 is mechanically secured by means of the photomultiplier tube enclosure body 1, which is coupled with the retaining ring 11 by means of retaining screws 13. The photomultiplier tube enclosure also prevents exterior sources of light and exterior sources of magnetic and electrical energy from reaching the photomultiplier tube 5 and thus distorting the readings obtained from radiation impulses. The photomultiplier tube enclosure 1 is composed of alloys which will absorb electrostatic and magnetic energy. The gasket members 2 and 3 effectively seal off all exterior light and prevent any light energy from reaching the photomultiplier tube and thereby distorting the radiation measurements.

What I claim is:

1. A scintillation meter component comprising a scintillation crystal having a photomultiplier tube of the type having a photo cathode of greater diameter than the electrical contact base optically coupled thereto, said photomultiplier tube being mounted within an enclosure consisting of a tubular member having a flanged bell-shaped flare at one terminus, a resilient ring axially mounted within the bell portion of said tubular member and light tight seals at both ends of said tubular member whereby a photomultiplier tube mounted therein will be sealed from light and maintained in contact with said luminophore by means of a positive pressure from said resilient ring.

2. The scintillation meter component of claim 1 wherein the tubular member has magnetic and electrostatic shielding properties.

3. The scintillation meter component of claim 1 wherein the scintillation crystal is a thallium activated sodium iodide scintillation crystal.

References Cited in the file of this patent

UNITED STATES PATENTS

| 1,764,368 | Thomas | June 17, 1930 |
| 2,114,612 | Schlesinger | Apr. 19, 1938 |
| 2,274,692 | Heim | Mar. 3, 1942 |
| 2,518,048 | Moore | Aug. 8, 1950 |
| 2,770,747 | Jensen | Nov. 13, 1956 |
| 2,907,881 | Roucayrol et al. | Oct. 6, 1959 |

OTHER REFERENCES

Nucleonics, April 1956, vol. 14, No. 4, article by Miller et al. on Reduction of NaI Background, page 41.